(12) United States Patent
Bonaccini et al.

(10) Patent No.: US 7,113,524 B2
(45) Date of Patent: Sep. 26, 2006

(54) NARROW BAND HIGH POWER FIBRE LASERS WITH EXTENDED WAVELENGTH COVERAGE

(75) Inventors: Domenico Bonaccini, Garching (DE); Wolfgang Hackenberg, Munich (DE)

(73) Assignee: Europaische Organisation fuer Astronomische Forschung in der suedlichen Hemisphaere, Garching (DE)

( * ) Notice: Subject to any disclaimer, the term of this patent is extended or adjusted under 35 U.S.C. 154(b) by 164 days.

(21) Appl. No.: 10/471,399

(22) PCT Filed: Mar. 7, 2002

(86) PCT No.: PCT/EP02/02520

§ 371 (c)(1),
(2), (4) Date: Sep. 10, 2003

(87) PCT Pub. No.: WO02/073754

PCT Pub. Date: Sep. 19, 2002

(65) Prior Publication Data

US 2004/0086004 A1    May 6, 2004

(30) Foreign Application Priority Data

Mar. 14, 2001 (EP) .................................. 01106261

(51) Int. Cl.
*H01S 3/30* (2006.01)
(52) U.S. Cl. .............................................. 372/6; 372/3
(58) Field of Classification Search ................ 372/3–6
See application file for complete search history.

(56) References Cited

U.S. PATENT DOCUMENTS

| 4,523,315 A | | 6/1985 | Stone | |
|---|---|---|---|---|
| 5,237,576 A | * | 8/1993 | DiGiovanni et al. | 372/6 |
| 5,305,335 A | * | 4/1994 | Ball et al. | 372/6 |
| 5,323,404 A | * | 6/1994 | Grubb | 372/6 |
| 5,493,626 A | * | 2/1996 | Schultz et al. | 385/101 |
| 5,838,700 A | * | 11/1998 | Dianov et al. | 372/6 |
| 5,901,264 A | * | 5/1999 | Camlibel et al. | 385/128 |
| 5,991,070 A | * | 11/1999 | Zanoni et al. | 359/341.33 |
| 6,020,991 A | * | 2/2000 | Yoshinori et al. | 359/341.1 |
| 6,041,070 A | * | 3/2000 | Koch et al. | 372/6 |
| 6,061,172 A | | 5/2000 | Naito et al. | |
| 6,130,981 A | * | 10/2000 | Nelson et al. | 385/128 |
| 6,301,271 B1 | * | 10/2001 | Sanders et al. | 372/3 |
| 6,301,273 B1 | * | 10/2001 | Sanders et al. | 372/6 |
| 6,407,855 B1 | * | 6/2002 | MacCormack et al. | 359/346 |
| 6,622,527 B1 | * | 9/2003 | Schotz et al. | 65/385 |
| 6,625,180 B1 | * | 9/2003 | Bufetov et al. | 372/3 |

FOREIGN PATENT DOCUMENTS

| EP | 0 784 217 A1 | 7/1997 |
|---|---|---|
| EP | 0 954 072 A1 | 11/1999 |

* cited by examiner

*Primary Examiner*—Minsun Oh Harvey
*Assistant Examiner*—Phillip Nguyen
(74) *Attorney, Agent, or Firm*—Scully, Scott, Murphy & Presser, P.C.

(57) ABSTRACT

A fibre laser comprises a fibre light guide (3) having an active medium, a laser as pumping source (1) and a first pair of Bragg gratings (6, 8) forming a first resonator (4). The first pair of Bragg gratings (6, 8) resonates the pump laser (1) and there is provided a second pair of Bragg gratings (7, 9) resonating at the output wavelength of the fibre laser.

12 Claims, 2 Drawing Sheets

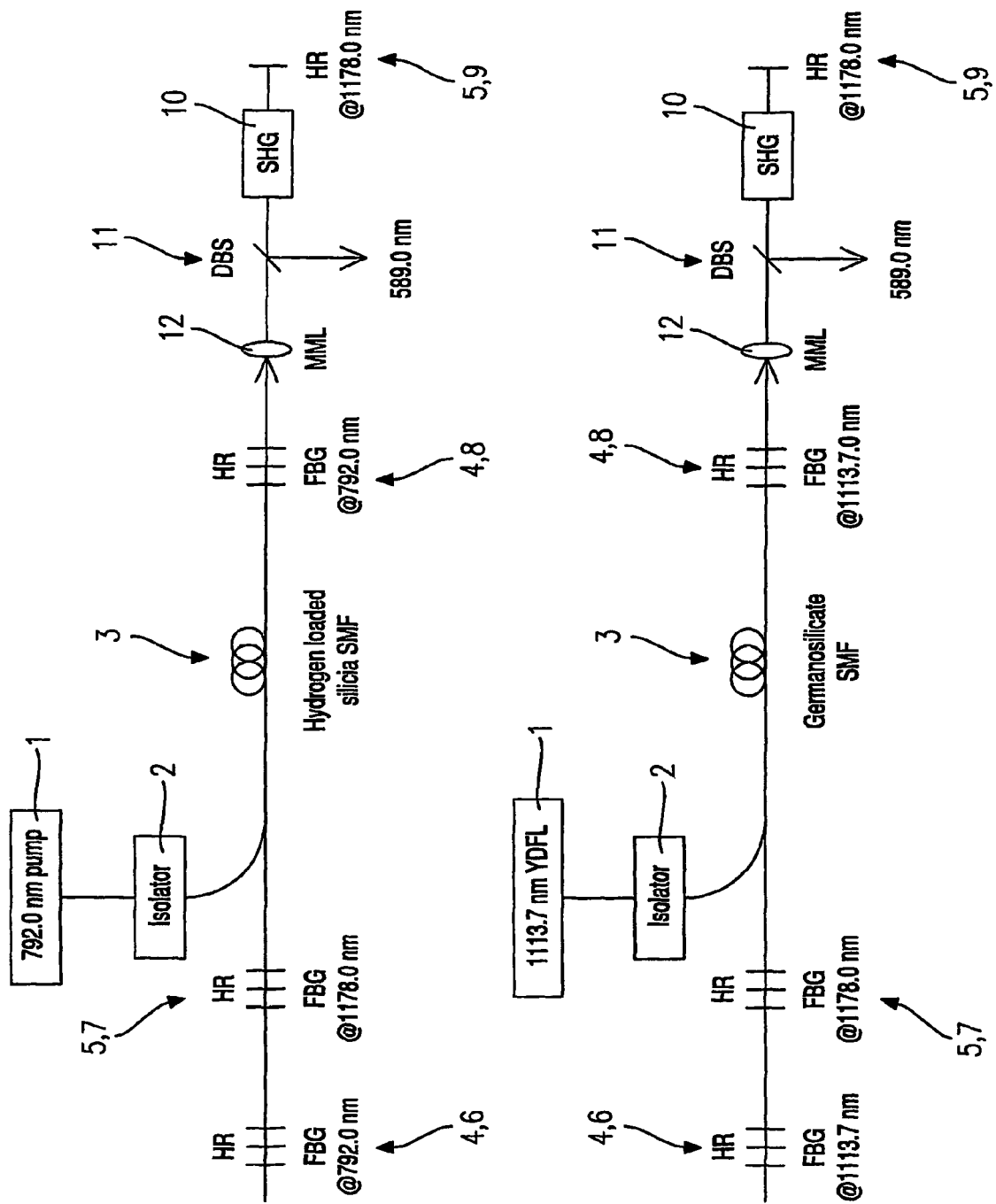

NARROW BAND HIGH POWER FIBRE LASERS WITH EXTENDED WAVELENGTH COVERAGE

Figure 1:
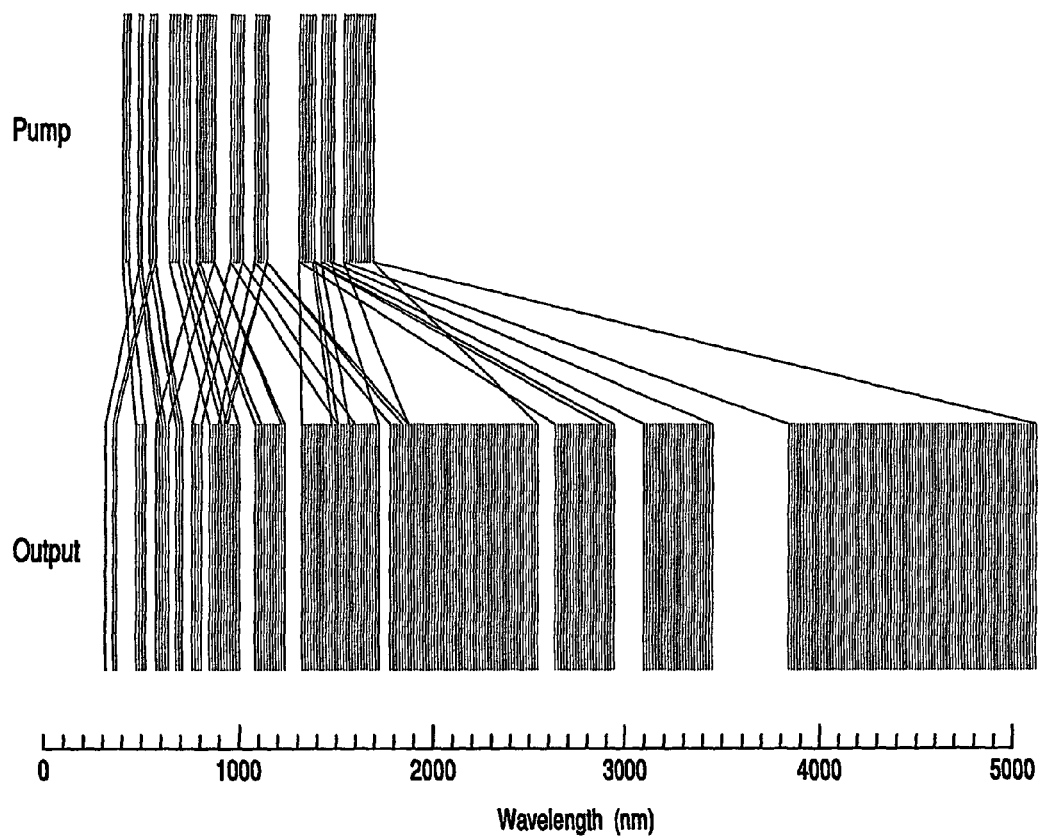

The invention relates to a method to obtain fibre resonating cavities for high power, narrow band fibre lasers by using short fibres and suppressing Stimulated Brillouin Scattering.

Furthermore, the invention relates to the application of the above mentioned resonator schemes to hydrogen-loaded Raman fibre lasers, thus adding the possibility to lase over an extended wavelength range. The use of hydrogen as the fibre Raman medium ensures the broadest wavelength coverage for a given laser pump.

Even further the invention relates to the production of multiple wavelength fibre lasers either with a single pump or with multiple pumps.

Currently narrow band solid-state lasers are available only at very sparse discrete wavelengths for the power ranges of interest. The diode lasers can produce emission lines only in narrow windows of the spectrum due to their very quantum nature.

The usual method to get lasing wavelengths not directly reached by the diode lasers is to use the diode lasers as pumps illuminating a lasing medium. The lasing medium absorption and fluorescence spectra are offset in wavelength, such that the pump's energy is absorbed and then stimulated-emitted at a different wavelength, defined by a resonator cavity or by a seed laser in a fibre laser amplifier. The efficiency of the process can reach 30 to 40% levels, being greatly enhanced if the lasing medium is in a resonating cavity.

Laser amplifier crystal materials, either bulk or as dopants in fibre cores, can extend the wavelength coverage of power lasers, but again only for sparse and discrete wavelengths associated with the atomic transitions of the lasing elements, usually rare-earth ions embedded in a host medium.

In recent years, waveguide (single-mode) fibre cores have been used as hosts for lasing materials. There are numerous advantages in using a fibre waveguide, including the extremely high concentration of the pump powers. For example 1W Continuos Wave (CW) of pump power corresponds to a density of $5MW/cm^2$ in a 5 micron core fibre.

Such a high concentration allows to exploit very efficiently non linear effects in the fibre, such as the stimulated Raman effect, with reported conversion efficiencies in the range of 40 to 80%. In the Raman effect, energy from the pump lasers photons is transferred to the vibrational bands of the atoms or molecules of the lasing material. The absorption spectrum of the vibrational bands is extremely broad, compared to normal lasing media (in the range of nm). The energy lost to excite the vibrational bands is subtracted to the pump photons, which get wavelengths red-shifted. If the Raman lasing medium is a Raman crystal inserted in a free space resonator cavity, the emitted laser line bandwidth is determined by the cavity properties and in principle there are no limitations in line-width. However, among other reasons thermal effects in the Raman crystal limits the achievement of high laser powers, while this is not a limit in optical fibres. In recent years, germanosilicate (pure or doped cores) Raman fibres have been developed and broad-line fibre Raman amplifiers are already on the market, with powers up to tens of Watts CW for the near infrared region. The use of Hydrogen as Raman medium has been demonstrated in free space, high-pressure (100 bar) high finesse cavities.

The fundamental problem of Raman fibre lasers is that they cannot so far deliver narrow line-width lasers of high powers. This is indeed a very major limitation for commercial power laser applications. The broad-band pumping diode-lasers are not the problem, but up to this invention the narrow line-width resonator has been.

With narrow laser line-width in the fibre waveguide, a competing non-linear effect, the stimulated Brillouin scattering (SBS), extracts energy from the laser photons creating phonons, or standing acoustic waves in the glass. The standing wave creates a density grating, which can very efficiently reject backward up to 80% of the laser power in the fibre. The parameters regulating those stimulated Raman scattering and stimulated Brillouin scattering non-linear processes in the waveguide are similar: effective mode-field diameter fibre length and linewidth. The fibre resonator, sending back and forth the laser radiation, increases the energy density by a factor proportional to the finesse of the cavity. The energy density enhancement increases the efficiency of the Raman and Brillouin processes. As soon as the laser line-width is narrow, the stimulated Brillouin scattering process becomes very effective, typically 100 times more effective than the Raman process, and an high power narrow linewidth conventional fibre laser becomes impracticable. This is the main reason of the failure of a few attempted designs.

On the other end, if narrow line-width solid state fibre Raman lasers can be produced based on a broad wavelength coverage Raman medium, they have the potential for an almost full bandwidth coverage, even with currently existing diode laser pumps.

It is important to note that the Raman and Brillouin non-linear effects differ also by the wavelength shift they introduce in the laser photons. This is exploited in this innovative fibre resonator laser design, to get high conversion efficiencies, narrow linewidth high power laserss.

A fibre laser cavity can be produced writing e.g. Bragg gratings. These are written in the fibre core glass, and can now produce resonator cavities with extremely high finesse and line-widths down to 10 kHz. Accurate tuning is achieved by stretching the periods of the Bragg gratings at the resonator end, either mechanically or thermally. A servo-control can be locked to a wavelength reference, stabilising the output frequency.

To enhance the production of fibre Bragg gratings, the fibres are loaded with hydrogen by a diffusion process. To clarify later one of the inventional claims, we note that the hydrogen molecules in the glass behave as if the gas is at high pressures, very much broadening the Raman profile.

From the European patent application EP 0 784 217 A1 a Raman fibre laser emitting at the wavelength of 1.24 μm and 1.48 μm and means for the enhancement of the radiation conversion efficiency in Raman scattering are known. The laser emitting at a wavelength of 1.24 μm comprises a pumping source, a fibre light guide containing $P_2O_5$ in an amount of 1 to 30 mole %, portions of a fibre light guide containing $GeO_2$ in an amount of 11 to 39 mole % and Bragg fibre optical gratings. The grating at the pump side forms a blank distributed reflector of an optical resonator for a first Stokes component. The second grating forms the output distributed reflector for the same resonator. The first Stokes component is derived at the output. In a Raman fibre laser emitting at a wavelength of 1.48 μm a second Stokes component is derived. A change in the refraction index in a portion of a fibre light guide is achieved by directing a laser radiation on it having a wavelength from 270 to 390 nm that passes through a protection polymer cladding of the fibre light guide.

The main drawbacks of the Raman fibre laser described in EP 0 784 217 A1 are especially the broad line width, the restricted wavelength coverage, which is limited to two discrete wavelengths. Furthermore, the gain of the second and sixth Stokes components is relatively low due to a low efficiency of higher order Raman scattering which leads to a low energy extraction in the laser.

Therefore the object of the invention is to provide a fibre laser of relatively high power and narrow line-width for extended wavelength coverage in the visible and near infra-red spectral regions.

It is a further object of the invention to enhance the width of the lasing spectral region available for a Raman fibre laser, with the possibility of multiple line laser outputs.

Yet a further object is the enhancement of the gain of stimulated Raman scattering to obtain a higher lasing power of the doped fibre.

These objectives are achieved by a fibre laser according to the present invention as claimed.

The inventive fibre laser comprises a light fibre guide doped with molecular hydrogen and at least two resonators for the laser pump and the desired lasing wavelength, each comprising two independently adjustable Bragg gratings. By enhancing the stimulated Raman scattering (SRS) and sub-pressing the competing stimulated Brillouin scattering (SBS), a high-energy narrow-band Raman power laser with nearly complete wavelength coverage in the visible and near infra-red part of the spectrum can be obtained.

Applications of the single wavelength fibre laser part of the invention are for example in spectroscopy, precision selective surgery, Laser Guide Stars for adaptive optics and in Lidar systems.

Figure 2:
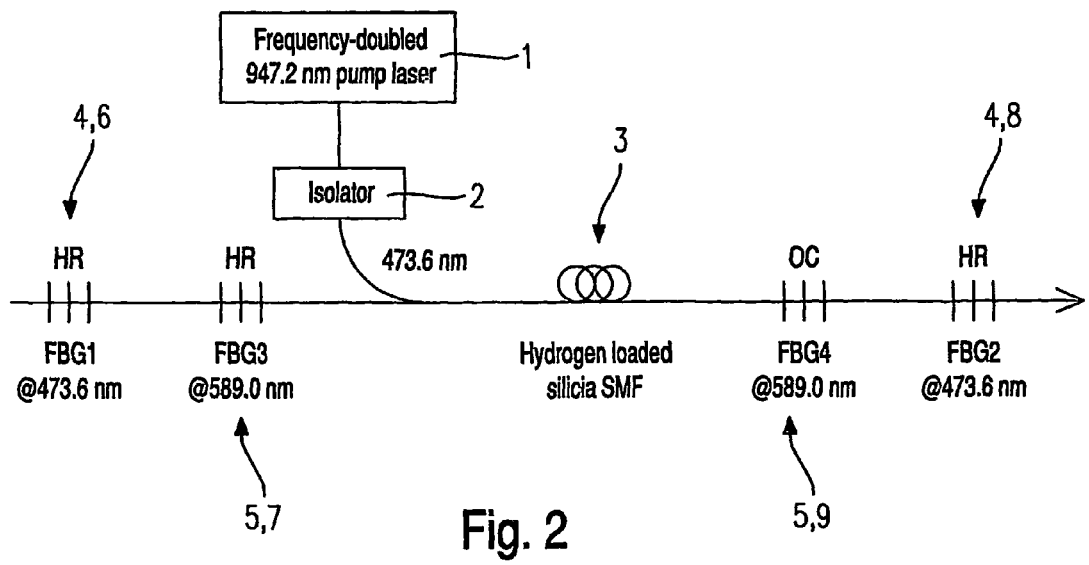

The invention can be more easily understood by studying the accompanying drawings, wherein FIG. 1 shows a diagram of the possible wavelength region covered by a $1^{st}$ order Stokes Raman fibre laser according to the invention, FIG. 2 shows a first embodiment of a Raman fibre laser according to the invention, FIG. 3 shows a second embodiment of a Raman fibre laser according to the invention, and FIG. 4 shows a third embodiment of a Raman fibre laser according to the invention.

FIG. 1 shows a diagram of the visible and near infrared spectrum with the wavelength coverage of a hydrogen Raman fibre laser according to the invention. The wavelength is given in nm.

The upper part of the diagram shows the spectral lines of the most common diode pump lasers suitable for pumping the inventive Raman fibre laser. Each of the spectral lines belongs to a different pump source. Including frequency-doubling, the wavelength range covered by the pumps is between 400 nm and 1700 nm.

The lower part of the diagram shows the corresponding red-shifted and broadened spectral lines of an inventive hydrogen-loaded $1^{st}$ order Stokes Raman laser which is doped by high pressure molecular hydrogen. Each output wavelength band corresponds to one of the pump sources above. The set of pump sources is not limited to the examples given above; with appropriate pumps the whole wavelength range may be covered.

The broadening and the red-shift of the spectral lines of the output are generated by the Raman effect in interaction with the molecular hydrogen dope in the light fibre guide. The hydrogen can be loaded into the fibre for example by a diffusion process in an $H_2$ atmosphere under pressures which exceed 100 bar. The hydrogen molecules can permanently be held in the fibre by an outer coating of the fibre formed by a layer of metal or carbon. On the other hand, the fibre can be kept in an appropriately small hydrogen cell, where the fibre ends are sealed within the cell.

FIG. 2 shows a first embodiment of an inventive Raman fibre laser doped with $H_2$. The Raman fibre laser comprises a frequency-doubled pump laser 1 emitting at a wavelength of 947.2 nm. The pump source is based on a diode laser pumped Neodymium crystal. An isolator 2 feeds the light at the single wavelength of 473.6 nm into a light fibre guide 3. The light fibre guide 3 is a single mode fibre. The length of the fibre is of the order of 10 to 100 m, so it is significantly shorter than fibres of conventional Raman fibre lasers which reach a length of 1000 m and more.

The Raman fibre laser further comprises two resonators 4 and 5, each consisting of a first Bragg grating 6 and 8 and a second Bragg grating 7 and 9, wherein Bragg gratings 6, 7 and 8 form high reflectors for the optical resonators 4 and 5, while Bragg grating 9 is formed as an output coupler.

In the first embodiment of the inventive Raman fibre laser shown in FIG. 2, the desired wavelength which is coupled out at the output coupler 9 is that of the Sodium D2 line at 589.0 nm.

The following table shows a survey of the features of the parts of the first embodiment of the Raman fibre laser.

| | | |
|---|---|---|
| Pump | Wavelength (in air) | 473.6 nm |
| | Power | 15 W |
| | Linewidth | 1 nm |
| Hydrogen loaded fibre | Core material | Fused silica |
| | Mode field diameter | 3.5 µm |
| | Length | 12 m |
| | Polarisation preserving | Yes |
| Bragg gratings 6 and 8 | Centre wavelength | 473.6 nm |
| | Bandwidth | 1.0 nm |
| | Reflectivity | 99% |
| Bragg gratings 7 and 9 | Centre wavelength | 589.0 nm |
| | Bandwidth | 0.6 µm |
| | Reflectivity | 99% (high reflector); 90% (output coupler) |

The second resonator 5 consisting of the output coupler 9 and a high reflector 7 resonates the red-shifted gain of the first Stokes component of the Raman scattered pump wavelength. According to the invention the Bragg gratings 7 and 9 are reflective at the first Stokes component of the Raman scattered light and are transmittive for the Brillouin scattered components. Thus the wavelength of the Raman scattered Stokes is resonated and starts lasing, while the Brillouin components leave the resonator without resonating or lasing.

This is the key element of the part of the invention for narrow-band high power fibre resonators. Without this key element, the stimulated Brillouin scattering gain is dominant over the Raman gain, e.g in fused silica by a factor ~20. An increase by large factors of the stimulated Raman scattering gain over the stimulated Brillouin scattering gain is now possible with Bragg gratings designed according to the invention, with Finesses of up to $10^4$.

In this embodiment example the Raman gain constant of hydrogen-loaded fused silica at 473,6 nm is $g_{R,0}=9,3\times10^{-14}$m/W. The stimulated Brillouin scattering gain constant at 589 nm is $g_{B,0}=5\times10^{-11}$m/W for a polarisation preserving fused silica fibre and narrow band pump light. For a linewidth of 0,5 GHz at 589 nm the stimulated Brillouin scattering gain constant is reduced by a factor of about 5. Thus, the ratio $g_{B,0}/g_{R,0}$ is here about 100, with a dominance of the stimulated Brillouin scattering. The Raman Stokes 1 photons see an effective length of the fibre longer than the Brillouin photons, by a factor proportional to the Finesse. This is because the Brillouin photons are not reflected by the Bragg gratings, thus not resonating. This allows a reverting of the natural situation, making the effective Raman gain larger than the Brillouin gain. This allows high power narrow band operation of the fibre laser.

Tuning and locking of the laser can be achieved using wavemeters or other frequency sensors to drive a servo-control to lock the lasing frequency. The servo-control will act by stretching the periods of the Bragg gratings either thermally or mechanically. Note that this scheme is modular and can be extended to multiple wavelength lasers.

FIG. 3 shows a second embodiment of a Raman fibre laser according to the invention.

The aim of the second embodiment is to show that different pump schemes for the same output frequency can be chosen, depending on the output power levels desired.

An infrared diode laser pump source 1 of a wavelength of 792.0 nm is used for pumping. The light of the pump source is fed into the single mode fibre light guide 3 via the isolator 2. The fibre can be designed in the same manner as described in the first embodiment.

The present embodiment comprises two interlaced resonators 4 and 5, each consisting of two Bragg gratings 6, 8 and 7, 9, wherein the first Bragg grating 7 of the second resonator 5, which resonates the Stokes components, is arranged between the first Bragg grating 6 and the second Bragg grating 8 of the pump resonator 4.

A second harmonic generator 10 generates the desired wavelength of 589.0 nm from the first order Stokes Raman, which is resonated at a wavelength of 1178.0 nm by the use of a dichroic beamsplitter 11. A mode-matching lens 12 is necessary between the Bragg grating 8 and the second harmonic generator 10 for processing the laser beam.

FIG. 4 shows a third embodiment of a Raman fibre laser according to the invention. Instead of a hydrogen doped single mode fibre, an infrared-pumped intracavity frequency-doubled Germanosilicate Raman laser for the wavelength of 589.0 nm utilising dedicated Bragg gratings for both the pump and the first order Stokes wave is used. The pump source 1 can especially be an Ytterbium doped fibre laser emitting at 1113.7 nm.

The basic structure of the Raman laser is similar to the structure described in the second embodiment shown in FIG. 3. The aim of the third embodiment is to show the versatility of the invented Bragg gratings scheme, which can be used with various fibres dopants, for various pump wavelength ranges.

The invention is not restricted to the embodiments described above but for example also applicable to more sets of Bragg gratings forming further resonators for multi-line laser output from one fibre.

In fact the feature of resonating only one single wavelength can be further extended to produce multiple wavelength laser resonators in the same fibre. This is realistic because single mode fibre resonators are virtually alignment free. Bragg reflectors for different wavelengths can be written in different sections of the same fibre, and non-reflected resonating wavelengths are transmitted at each Bragg grating. The resonating cavities will have an outer shell geometry and will be tuned in cascade by stretching the periods of the Bragg gratings either thermally or mechanically. A modular global control algorithm has to be adopted which is rather common in servo-control theory. Wavemeters or frequency sensors will drive the servo-control to lock the lasers' frequency.

Since the Raman gain with hydrogen in glass is very broad, a single pump can serve several lasing wavelengths within the Raman gain profile. Otherwise also multiple-pumped schemes are possible to extend the emitted line ranges.

Important examples of applications for the invented multiline narrow band high power fibre laser are in multiline spectroscopy, for example in the DNA screening, where four visible wavelength lasers are required at the same time; or in telecommunications where high power multiple transmission channels reduce the transmitter complexity; or, in the large display industry where the RGB or equivalent colours are required.

The invention claimed is:

1. A fibre laser comprising a fibre light guide (3) having an active medium, a laser as pumping source (1) and a first pair of Bragg gratings (6, 8) forming a first resonator (4), characterized in that
the first pair of Bragg gratings (6, 8) resonates the pump laser (1) and that there is provided a second pair of Bragg gratings (7, 9) resonating at the output wavelength of the fibre laser, wherein the fibre laser uses the Raman-effect and the second pair of Bragg gratings forms a selectively resonating resonator extracting Brillouin-scattered photons scattered at a bulk material of the fibre light guide.

2. Fibre laser according to claim 1,
characterized in that
there is provided a further pair of Bragg gratings resonating at a further output wavelength of the fibre laser.

3. Fibre laser according to claim 1 or 2,
characterized in that also the further pair of Bragg ratings (7, 9) forms a selectively resonating resonator (5) extracting Brillouin-scattered photons scattered at a bulk material of the fibre light guide (3).

4. Fibre laser according to claim 3,
characterized in that
the active medium is an impurity dope comprising molecular hydrogen.

5. Fibre laser according to claim 1,
characterized in that
each of the resonators (4, 5) formed by the pairs of Bragg gratings (6, 8; 7, 9) is arranged in a manner that a cavity of the light fibre guide (3) belonging to each of the resonators (4, 5) is tuneable independently of each other.

6. Fibre laser according to claim 1,
characterized in that
the length of the light fibre guide (3) is between 10 and 100 meters.

7. Fibre laser according to claim 1,
characterized in that
the fibre is based on fused silica.

8. Raman fire laser according to claim 4,
characterized in that
the molecular hydrogen is loaded into the fibre light guide (3) by diffusion from a molecular hydrogen atmosphere.

9. Raman fibre laser according to claim 8,
characterized in that
the molecular hydrogen atmosphere for loading the fibre light guide is held at a pressure of $\geqq 100$ bar.

10. Raman fibre laser according to claim 1,
characterized in that
the fibre light guide (3) is hermetically sealed by an outer coating of metal or carbon.

11. Raman fibre laser according to claim 10,
characterized in that
the metal coating consists of Aluminum (Al) or Copper (Cu) or Gold (Au).

12. Raman fibre laser according to claim 1,
characterized in that
one of the Bragg gratings (7, 9) forming the selectively resonating resonator (5) is designed as an output coupler (9).

* * * * *